US012720337B2

(12) United States Patent
Kasap et al.

(10) Patent No.: US 12,720,337 B2
(45) Date of Patent: Aug. 25, 2026

(54) MANAGING A PRIVATE COMMUNICATIONS NETWORK

(71) Applicant: MICROSOFT TECHNOLOGY LICENSING, LLC, Redmond, WA (US)

(72) Inventors: Mustafa Kasap, Kenmore, WA (US); Jason Hogg, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 483 days.

(21) Appl. No.: 18/385,346

(22) Filed: Oct. 30, 2023

(65) Prior Publication Data

US 2025/0142370 A1 May 1, 2025

(51) Int. Cl.

*H04W 24/04* (2009.01)
*H04L 41/142* (2022.01)
*H04L 41/22* (2022.01)
*H04W 16/18* (2009.01)

(52) U.S. Cl.

CPC ........... *H04W 24/04* (2013.01); *H04L 41/142* (2013.01); *H04L 41/22* (2013.01); *H04W 16/18* (2013.01)

(58) Field of Classification Search

CPC .... H04W 24/04; H04W 16/18; H04L 41/142; H04L 41/22
USPC .......................................................... 455/418
See application file for complete search history.

(56) References Cited

U.S. PATENT DOCUMENTS

2022/0171510 A1* 6/2022 Fredericks .......... G06F 3/04842
2024/0114349 A1* 4/2024 Miguel .................. H04L 41/16
2025/0094482 A1* 3/2025 Najdenkoska .......... G06F 16/55

* cited by examiner

*Primary Examiner* — Jirapon Tulop
(74) *Attorney, Agent, or Firm* — Han Gim; Newport IP, LLC

(57) ABSTRACT

A management node local to a customer site of a private communications network stores a model. The model is a compact version of a visual language model remote from the customer site. A first screen shot of a dashboard of telemetry data measured from the private communications network is accessed. A prompt is formulated comprising the first screen shot and information to adapt the model to the private communications network via few shot learning. The prompt is submitted to the model. An output is received from the model comprising textual information about anomalies or trends depicted in the first screen shot. The output is checked against data from a statistical model of the telemetry data, the statistical model being independent of the model. In response to the check being successful, an action is triggered to manage the private communications network according to the output.

20 Claims, 8 Drawing Sheets

MANAGING A PRIVATE COMMUNICATIONS NETWORK

BACKGROUND

Deploying and managing 4G or 5G core wireless network functions on a small footprint located at an enterprise site is challenging in many respects. User plane, control plane, subscriber plane and policy functions are to be deployed at the edge in order to enable a private 4G or 5G communications network. High availability is desired to ensure the network remains operational even in the event of network disruptions or outages, providing enterprises with critical reliability and uptime.

The embodiments described below are not limited to implementations which solve any or all of the disadvantages of known ways of managing private 4G or 5G communications networks.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A telecommunications operator of a private mobile communications network is typically faced with a dashboard of graphical displays of telemetry data from the private mobile network. Interpreting the dashboard manually is difficult to achieve in an accurate, consistent manner. Using a visual language model in the cloud to interpret the dashboard is difficult to achieve since there are problems with latency and/or hallucinations of visual language models. A visual language model is a machine learning model that takes visual content as input such as images, videos, screenshots, in addition to text input. A visual language model typically comprises an image encoder, a text encoder and a mechanism to fuse information from the two encoders. In some cases a visual language model has a single encoder that encodes both visual content and text. A visual language model generates output in the form of text. A non-exhaustive list of example visual language models is: CLIP, FLAMINGO, GPT-4V(ision), LLaVA large language and vision assistant.

A management node local to a customer site of a private communications network stores a model. The model is a compact version of a visual language model remote from the customer site. A first screen shot of a dashboard of telemetry data measured from the private communications network is accessed. A prompt is formulated comprising the first screen shot and information to adapt the model to the private communications network via few shot learning. The prompt is submitted to the model. An output is received from the model comprising textual information about anomalies or trends depicted in the first screen shot. The output is checked against data from a statistical model of the telemetry data, the statistical model being independent of the model. In response to the check being successful, an action is triggered to manage the private communications network according to the output.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
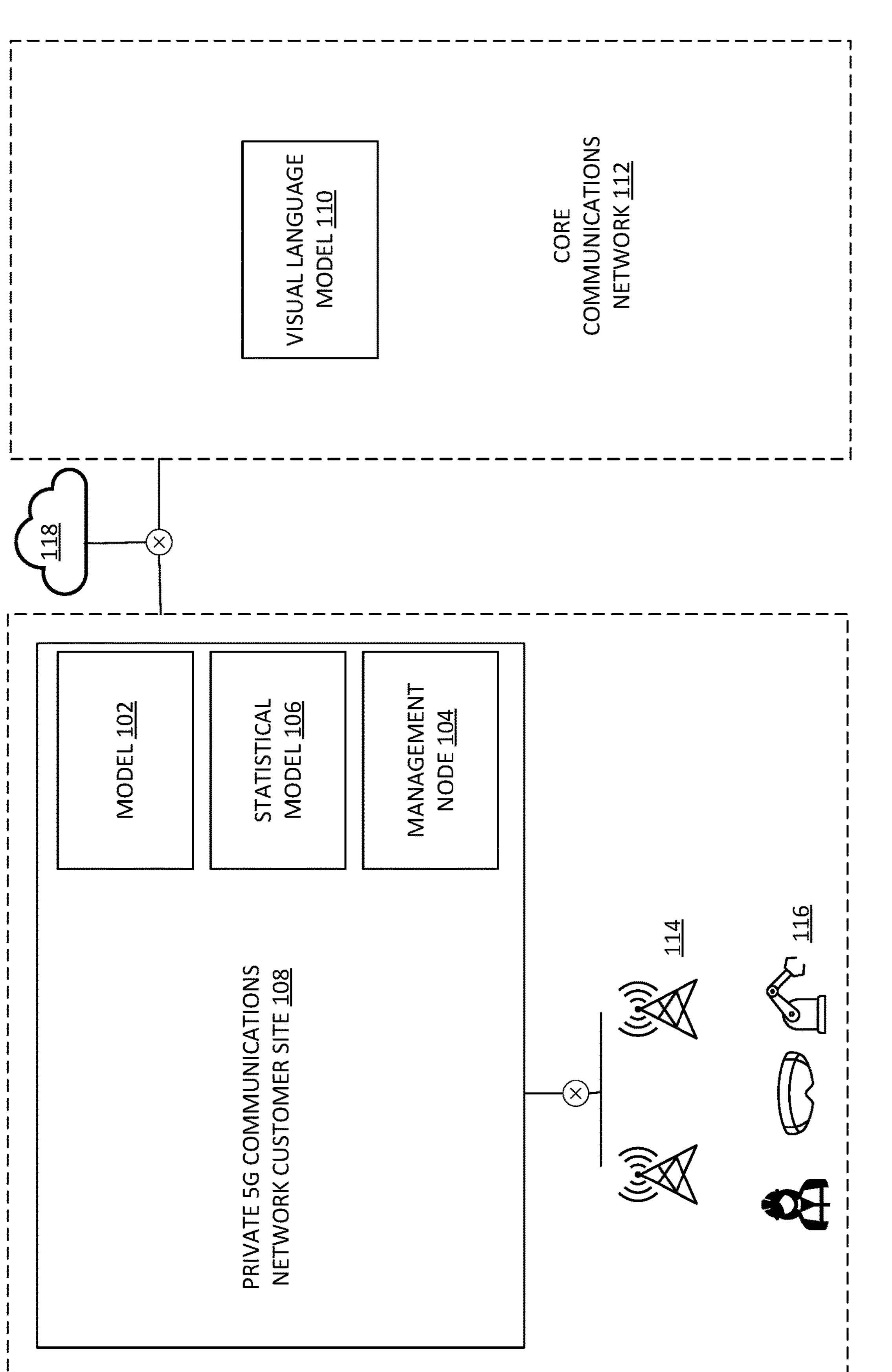
FIG. 1 is a schematic diagram of a private mobile communications network at a customer site connected to a core communications network.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

A telecommunications operator of a private mobile communications network is typically faced with a dashboard of graphical displays of telemetry data from the private mobile network. Interpreting the dashboard manually is difficult to achieve in an accurate, consistent manner. The dashboard is typically highly complex and comprises a plurality of graphs, charts, tables of data and other graphical information depicting telemetry data from the mobile communications network and optionally also topology data. The inventors have recognized that using a visual language model to assist with interpreting the dashboard is beneficial. However, using a visual language model in the cloud (rather than at the edge where the private mobile network is deployed) to interpret the dashboard is difficult to achieve since there are problems with latency. Latency is introduced as a result of round trip time between a private mobile communications network deployed at the edge and a visual language model available as a service via the Internet or deployed in a core communications network in the cloud. Latency is also introduced by processing latency of the visual language model itself, which in the case of a visual language model with billions of parameters may be a latency of several minutes. Latency is a significant problem where managing a mobile communications network because mobile communications networks provide real time services which are often critical such as provision of calls to emergency services.

Using output from visual language models for managing mobile telecommunications networks is problematic since the outputs may comprise hallucinations which are inferences from a model which are factually incorrect. Thus relying on outputs from visual language models to control a mobile communications network may lead to incorrect or detrimental actions being taken.

Where a telecommunications operator of a private mobile communications network deploys upgrades to virtual network functions and other components of the private mobile communications network it is best to follow safe deployment practices. Safe deployment practices involve following rules and policies concerning an order or schedule in which deployments are made. The schedule includes evaluation procedures which evaluate stages of the deployment and rolls those back if the evaluation finds the deployment produced unintended consequences or poor results.

Telecommunications operators also face problems when deploying upgrades or new services in a mobile communications network. Safe deployment practices are to be followed in order to enable roll back of a stage of a deployment in the event of an unintended consequence or poor performance. However, where a central visual language model in the cloud is being used to interpret telemetry data during a safe deployment schedule, problems are found with the quality and accuracy of output from the visual language model.

FIG. 1 is a schematic diagram of a private mobile communications network deployed at a customer site 108. The private mobile communications network comprises a radio access network having one or more mobile base stations 114 as well as a private mobile communications network deployed using one or more mobile edge computing nodes. The private mobile communications network comprises a visual language model 102, a statistical model 106 (which is not a machine learning model) and a management node 104. End users at the customer site 108 are able to access the private mobile communications network using communications devices such as wearable computers, smart phones, or via internet of things sensors embedded in machinery. A non-exhaustive group of examples of communications devices is indicated in FIG. 1 at 116.

The visual language model 102 is a compact version of a visual language model 110 remote from the customer site. The visual language model 110 which is remote from the customer site has a transformer architecture and billions of parameters. In an example it is a large language model with a billion to a trillion parameters and which is multi-model in that it is able to take visual content as input as well as text input. In contrast the model 102 at the customer site is significantly smaller than the visual language model 110 in a core communications network 112. In an example the visual language model in the customer site has one hundredth the number of parameters of the visual language model in the cloud. In some examples the visual language model 102 at the customer site is formed from the visual language model 110 remote from the customer site by using knowledge distillation. As a result the compact visual language model 102 retains much of the functionality and accuracy of the visual language model 110 remote from the customer site. Knowledge distillation allows models with small parameters and weak learning capabilities to have the accuracy of large models.

The statistical model 106 is not a machine learning model. A non-exhaustive list of examples of statistical model 106 is: spreadsheet macro for generating a chart: functions for computing statistics such as average, mean, median, mode, rolling average, percentiles, ranges: process for plotting data on single (or multiple page) charts where peak points and/or unusual trends can be easily seen by a human viewer: process for data visualization, process to identify correlations in different streams of data, process to visualize data from a stream of data during a specified time window: process to blend two time series of data: process to decompose a time series into one or more signals. The statistical model may do one or more of: fit curves onto scattered data, draw support vector boundaries onto a plot of data, define ranges or acceptable margins of a plot of data points.

The management node 104 is a server or other machine that provides a user interface for a telco operator. Via the user interface the telco operator is able to manage the private communications network by sending configuration files to an orchestrator of the private communications network. The orchestrator is in a control plane of the communications network as explained with reference to FIG. 2 and may be a Kubernetes (trade mark) orchestrator, Docker Swarm (trade mark), Redhat OpenShift (trade mark) or other type of orchestrator. Via the user interface the telco operator is able to view a dashboard of telemetry data measured from the private communications network.

Telemetry data measured from the private communications network is obtained from logs in the control plane of the communications network and by observing metrics such as round trip time, packet loss frequency, bandwidth, number of dropped calls and other metrics.

FIG. 1 shows a single private 5G communications network customer site 108 connected to a core communications network 112 such as a data centre, cluster of compute servers or other communications network with compute resources. In practice, a customer has more than one site with each site having a private 5G communications network connected to the core communications network. Internet 118 is depicted in FIG. 1 to indicate how the private communications network is connected to a public communications network such as the internet.

By using a compact model 102 at the customer site 108 it is possible to address latency issues. When a telecommunications operator uses the management node 104 to interpret telemetry data from the private 5G communications network, the telco operator is able to achieve this in near real time using the local model 102 as explained in more detail below.

By using a statistical model 106 which is independent of the model 102, it is possible to mitigate risks from hallucinations. The statistical model is independent of the model 102 since the statistical model is not a machine learning model. By checking output of the model 102 against information from the statistical model 106 it is possible to identify hallucinations.

Figure 2:
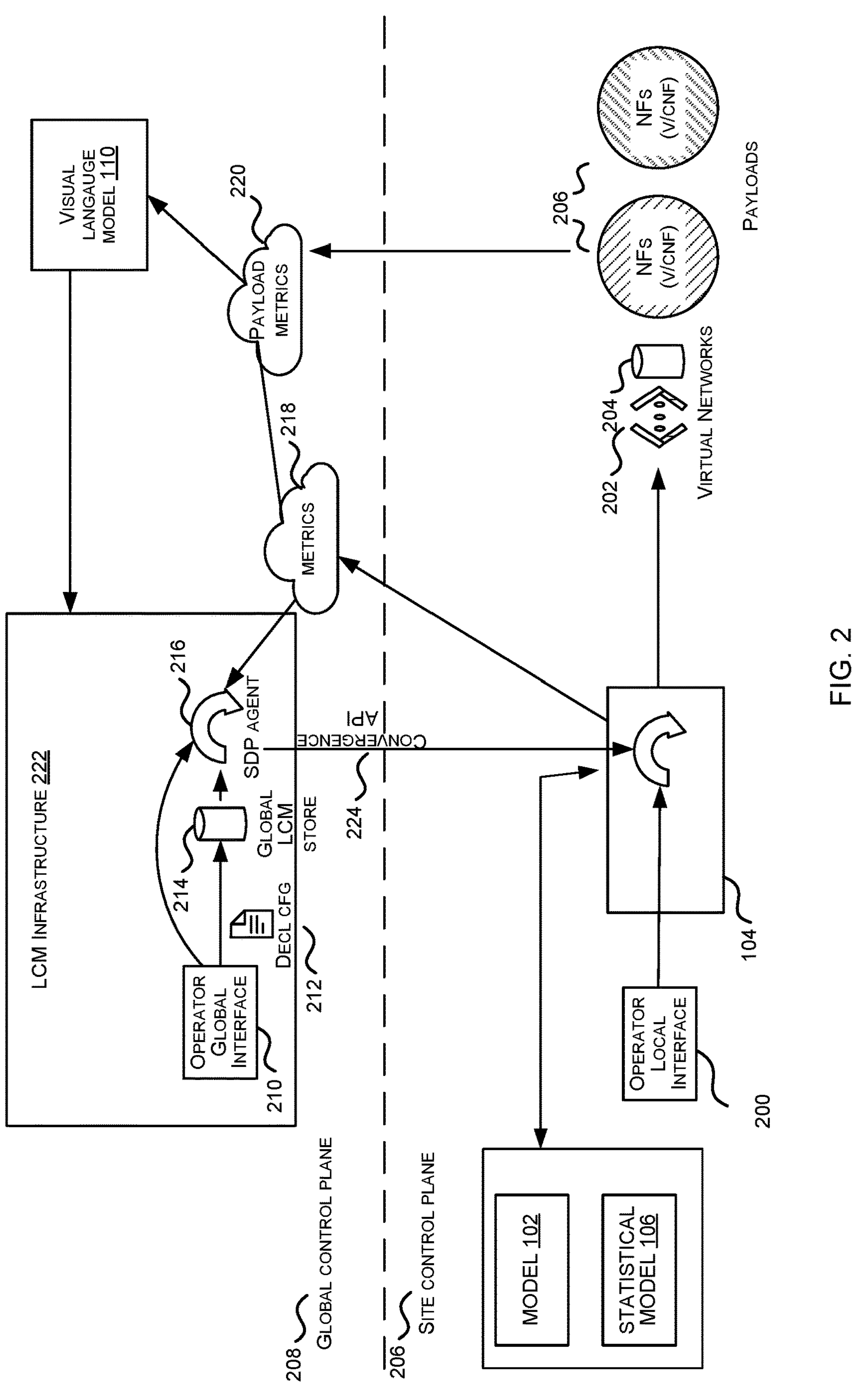
FIG. 2 is a schematic diagram of a control plane of the private mobile communications network of FIG. 1 as well as of a global control plane.

FIG. 2 is a schematic diagram of a control plane 206 of the private mobile communications network of FIG. 1 as well as of a global control plane 208. The global control plane is global in that it controls a plurality of site control planes 206 although only one site control plane 206 is shown in FIG. 2 for clarity. Both the global control plane 208 and the site control plane 206 are implemented using software that is distributed over physical communications network nodes that make up infrastructure of the communications network.

The global control plane 208 has a software agent 216 that controls when and how configuration files and/or instructions are sent to a management node 104 in the site control plane 206. In some but not all examples the software agent 216 is a safe deployment practices SDP agent. The management node comprises an orchestrator indicated by the curved arrow in management node 104. A convergence application programming interface 224 enables the software agent 216 in the global control plane 208 and the orchestrator in the site control plane to communicate.

An operator local interface 200 exists which is a graphical user interface or other user interface enabling a telco operator to control the site control plane via the management node 104. Using the operator local interface 200 a telco operator is able to view a dashboard of telemetry data measured from the communications network controlled by the site control plane. The communications network comprises a plurality of network functions 206 which are containerized applications that implement a communications network. In some cases the network functions 206 are virtual network functions. Using the network functions 206 one or more virtual networks 202 are formed to enable communications at a private communications network controlled by the site control plane 206.

Telemetry data is measured from the communications network controlled by the site control plane 206. The telemetry data comprises payload metrics 220 measured by the network functions 206 as well as metrics 218 obtained by the management node 104 by probing the network, by reading logs 204 in the network, by observing round trip times, by measuring bandwidth levels, and in other ways.

The telemetry data is communicated to a statistical model 106 in the site control plane by the management node 104. The telemetry data is also communicated to the global control plane 208 as indicated in FIG. 2. The statistical model 106 produces charts, plots, statistics or other data from the telemetry data for display on a dashboard.

The management node 104 is able to use the model 102 (which is the compact model of FIG. 1) to interpret a screenshot of a dashboard of the telemetry data. Using the management node, an operator is able to make changes to a configuration file, or create a new configuration file, which when executed by the orchestrator in the management node, deploys changes in the virtual networks 202 and/or network functions 206. The operator is able to instantiate more network functions in order to scale up services by giving an appropriate configuration file to the orchestrator. In the same way the operator is able to delete or edit a network function or change topology of a virtual network.

In some examples, the telco operator also has an operator global interface 210 enabling them to manage multiple of their sites, each site having a site control plane 206. The operator global interface is part of a life cycle management infrastructure 222 of the global control plane. The life cycle management infrastructure 222 comprises a software agent 216 that receives telemetry data from the site control planes. Note that although only one site control plane is shown in FIG. 2 there are a plurality of site control planes each sending telemetry data comprising metrics 218 and payload metrics 220 to the global control plane 208.

The operator global interface enables the telco operator to control the site control plane(s) by sending instructions to the software agent 216 which then instructs an orchestrator in each site control plane. The operator global interface may generate a declarative configuration (Decl cfg) file which is sent to the software agent 216 via a global life cycle management store 214. The global life cycle management store may check the declarative configuration file 212 complies with rules or criteria for safe deployment practices. If the check is successful the declarative configuration file is forwarded to the software agent 216 and used to instruct one or more orchestrators in the site control planes.

Within the global control plane 218 there is a visual language model 110 (such as that of FIG. 1) which is significantly larger than the model 102 in the site control plane 206.

Figure 3:
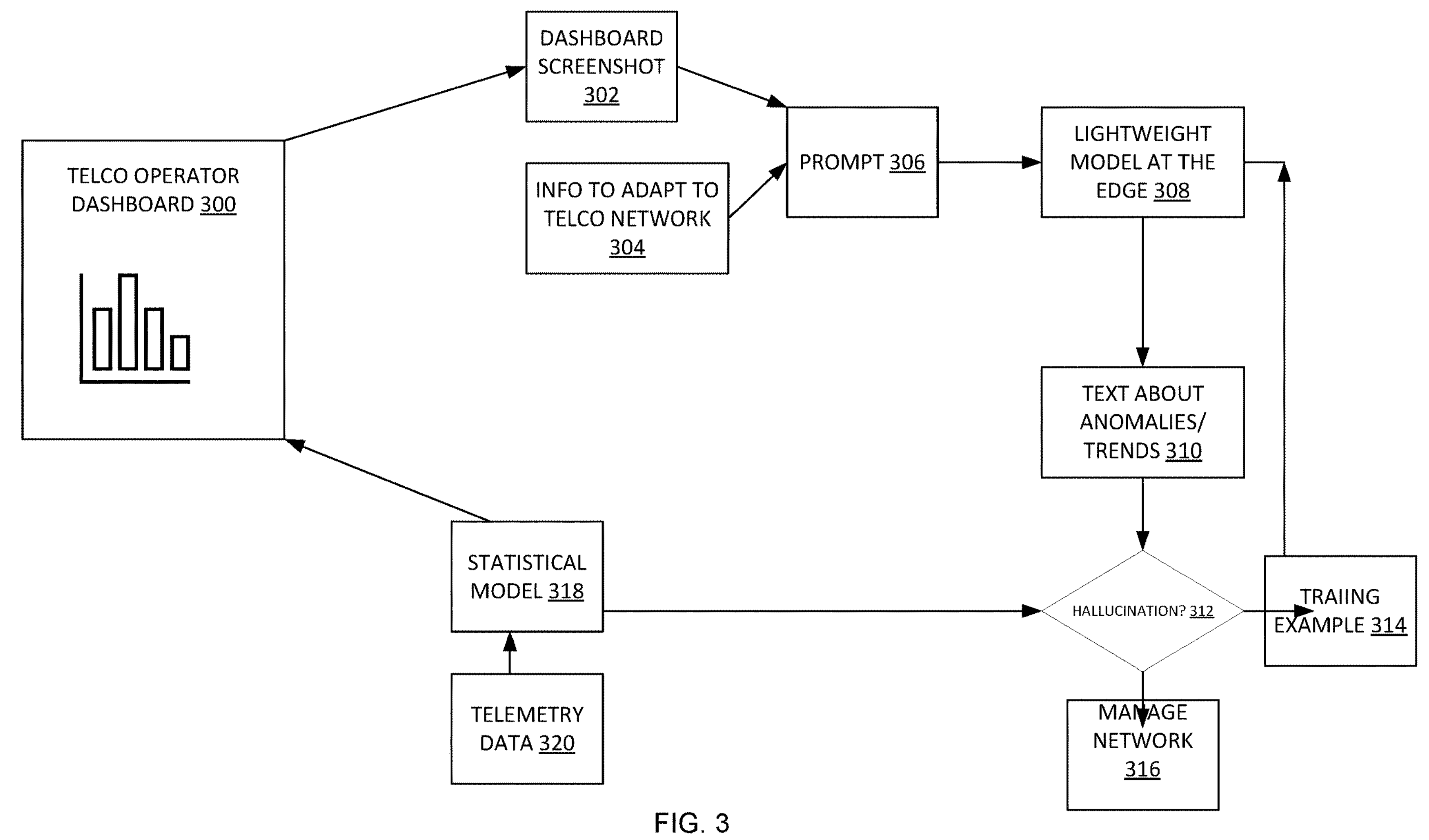
FIG. 3 is a schematic diagram of inputs to a lightweight visual language model at a private mobile communications network customer site.

FIG. 3 is a schematic diagram of inputs to a lightweight visual language model 308 at a private mobile communications network customer site. The lightweight visual language model 308 is an example of model 102 of FIG. 1. Telemetry data 320 is available from a communications network such as a private mobile communications network at a customer site as indicated in FIG. 1. The telemetry data is measured from the communications network and comprises metrics and log data. The telemetry data is input to a statistical model 318 to produce one or more plots, charts, graphs or other graphical representations of the telemetry data. The graphical representations of the telemetry data are displayed at a telco operator dashboard 300 such as via operator local interface 200 of FIG. 2, or operator global interface 210 of FIG. 2.

A screenshot of the dashboard 300 is accessed and used to form a prompt 306. The screenshot is automatically captured by management node 104 (see FIGS. 1 and 2) in some cases. The screenshot is copied into the prompt 306. The prompt optionally also comprises information to adapt the lightweight model 308 for operation with the telecommunications network i.e. the private communications network at the customer site (see FIG. 1).

The prompt is input to the lightweight model 308. The lightweight model 308 is at the edge of a communications network since it is located at a customer site rather than being located in the cloud or a core communications network. Because the prompt 306 comprises information to adapt the lightweight model 308 to the private communications network, the lightweight model is adapted and becomes bespoke for the particular private communications network.

The lightweight model 308 computes an output in response to the prompt 306. The output comprises text 310 about any anomalies or trends, identified by the lightweight model 308, in the telemetry data represented in the dashboard screenshot 302. Because the lightweight model 308 is located at the edge and is in the private communications network, latency incurred through sending the prompt 306 to the lightweight model 308 is extremely low. Latency incurred through sending an output of the lightweight model 308 to the management node at the customer site is also extremely low: Because the lightweight model 308 is more compact than the visual language model in the cloud, the latency incurred for the lightweight model 308 to compute an output given the prompt is low.

A check 312 is made to check whether the output from the lightweight model 308 is a hallucination or not. The check comprises comparing the output from the lightweight model 308 with data from the statistical model 318. Since the statistical model 318 is independent of the lightweight model 308 the check is able to filter out hallucinations. In an example, the check comprises obtaining a statistical value from the statistical model 318 and checking if the same value of the statistic is present in the output.

In response to the check 312 being successful, an action is triggered to manage 316 the private communications network according to the output. In some cases the action is to send a message to a telco operator by email or other means. In some cases the action is to send a configuration file to an orchestrator in a site control plane of the private communications network as explained with reference to FIG. 2 above. In some cases the action is to offer a candidate configuration file to a telco operator to be executed automatically on their selection. In some cases, prior to triggering the action to manage the network, a confidence value is obtained associated with the output from the model and in response to the confidence value being lower than a threshold, the prompt is sent to the visual language model remote from the customer site in a core of the public communications network. Prior to sending the prompt to the visual language model remote from the customer site, the prompt is changed by replacing the screen shot by source code used to plot a chart depicted in the screen shot, or by distilled major data points from a chart depicted in the screen shot. This helps to reduce bandwidth requirements and improve latency by reducing the size of the prompt. A response is obtained from the visual language model in the cloud, the response is checked against the data from the statistical model; and in response to the check being successful, triggering the action to manage 316 the network.

In response to the check being unsuccessful, the method optionally comprises using the screenshot 302 and the data from the statistical model as a labelled training example to train the lightweight model 308 and/or the visual language model remote from the customer site.

In summary FIG. 3 illustrates a method performed by a management node local to a customer site of a private communications network. The management node may be management node 104 of FIG. 1 or FIG. 2. The method comprises storing a model 102, 308, the model being a compact version of a visual language model 110 remote from the customer site. Because the model 102, 308 is compact it can be deployed at the customer site where resources are limited. Because the model is compact it has a lower latency to process an input and generate an output than the visual language model 110 in the cloud or other location where resources are readily available. Because the model 102, 308 is deployed at the customer site, round trip time of messages between the model 102, 308 and the management node 104 is lower than a round trip time between the management node and the visual language model 110 at the remote location.

The management node accesses a first screen shot of a dashboard of telemetry data measured from the private communications network. The dashboard may have been computed by the statistical model and displayed at a graphical user interface of the management node 104. The management node optionally captures a screen shot of the dashboard or part of the dashboard. Accessing the screenshot is fast and straightforward. The management node formulates a prompt comprising the first screen shot and information to adapt the model to the private communications network via few shot learning. Formulating the prompt is thus achieved in an efficient manner. The information to adapt the model comprises a plurality of labelled training examples, each labelled training example being a screen shot of the dashboard and text about presence or absence of an anomaly in a graphical representation of the telemetry data or presence or absence of a trend in the telemetry data. The labelled training examples are used for few shot learning by the model 102. In an example there are two, three or four labelled training examples in the prompt. Optionally, information about performance of the internet is added to the prompt. This is done by receiving the internet performance data from a third party service in graphical or visual form and adding a screen shot or other visual representation of the internet performance to the prompt.

The management node submits the prompt to the model 102, 308 and the model uses the labelled training examples in the prompt to carry out few shot learning. The few shot learning is supervised learning using backpropagation with gradience descent or any other type of supervised learning. The model uses the screen shot of the dashboard as a prompt subsequent to the few shot learning completing. Thus the model is bespoke to the private communications network at the customer site before the screenshot is input to the model.

An output is received from the model comprising textual information about anomalies or trends depicted in the first screen shot. The textual information may say that no anomalies are detected or may say that one or more anomalies are detected. The textual information may say that a trend is detected and give information about the trend.

The output is checked 418 against data from a statistical model of the telemetry data, the statistical model being independent of the model. In this way hallucinations of the model 102, 308 are detected. In response to the check being successful (i.e. no hallucination is detected) the management node triggers 420 an action to manage the private communications network according to the output. This gives a principled way to manage the communications network which is efficient to implement. The result is a more efficiently managed communications network such that resources (bandwidth, compute capacity) are used more effectively, load balancing is achieved, and resources are scaled dynamically as demands fluctuate in the communications network.

In response to a hallucination being detected at check 418 a training example is formed 422 comprising the screen shot from operation 406 and the statistical model output from operation 404. In response to a confidence value associated with the output 416 from the model being lower than a threshold, for each of a specified number of consecutive outputs of the model, adapting the compact model using training examples obtained from the visual language model (such as training example formed at operation 422).

In some examples, at check 418, if no hallucination is found, the method comprises, prior to triggering the action 420, obtaining a confidence value associated with the output 416, and in response to the confidence being above a threshold sending a prompt to the visual language model remote from the customer site, the prompt comprising a portion of the telemetry data associated with a potential anomaly. This enables more detail to be obtained from the model in the cloud. The portion of the telemetry data is in finer detail than the telemetry data, and the prompt comprises a request for a confirmation of the anomaly and suggested actions to correct the anomaly.

Alternatively, or in addition, the functionality of the management node 104 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The compact model local to the management node of the disclosure operate in an unconventional manner to enable real time detection of anomalies or trends in telemetry data of a private communications network.

The compact model improves the functioning of the underlying private communications network by enabling principled, efficient management using screenshots of dashboards having graphical representations of telemetry data.

Figure 4:
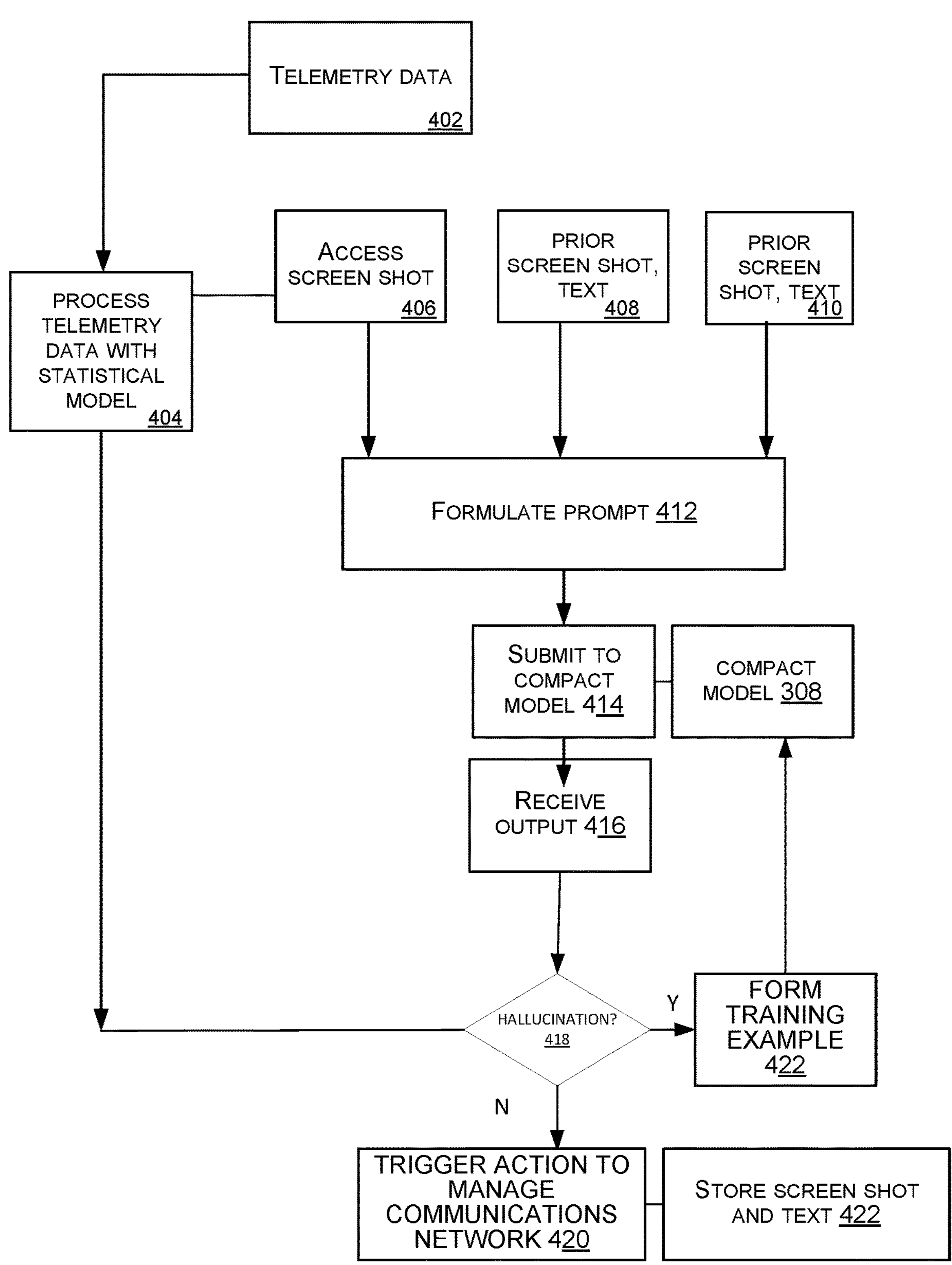
FIG. 4 is a flow diagram of a method performed by a management node of a private mobile communications network customer site.

FIG. 4 is a flow diagram of a method performed by a management node 104 of a private mobile communications network customer site. A stream of telemetry data 402 is available from a control plane of the communications network. The telemetry data comprises payload data, round trip times, packet loss rates, customer call quality ratings, bandwidth levels, and other metrics. The telemetry data is processed 404 with a statistical model to produce graphical representations of the telemetry data displayed on a graphical user interface dashboard of the management node. A screen shot of the dashboard is taken by the management node and stored. The screen shot is accessed and used to formulate 412 a prompt. The management node accesses a plurality of prior screen shots 408, 410. Each prior screen shot is of the dashboard at a previous time instance and has associated text about any anomalies or trends depicted in the screen shot. The prior screen shots and text were previously stored by the management node as explained in more detail with reference to operation 422 below: There number of pairs of prior screen shot and text is two or more. In an example three or four pairs are used or up to 30 pairs. Each pair is a labelled training example for use in supervised training.

The management node formulates 412 a prompt by adding the screen shot and the prior screen shots with text, into a template. The template orders the items in the prompt and includes text such as "Identify any anomalies or trends in the following current dashboard of telemetry data from a private 5G communications network. Previous examples of dashboards and anomalies and trends identified in those dashboards are given here. Write a configuration file for submitting to an orchestrator to manage the communications network in light of the anomalies and trends in the current dashboard".

Another example of a prompt is "Given this dashboard of telemetry data, give me the rough total volume of data generated every hour in the last two days in tabular data format".

Another example of a prompt is "Given this dashboard of telemetry data, what is the average volume of data approximately generated in the communications network in the last two days".

The prompt is submitted 414 to the compact model which generates text and optionally a candidate configuration file. The generated text and candidate configuration file is the output of the compact model 308 and is returned to the management node.

The management node receives 416 the output and checks 418 whether the output comprises a hallucination or not. The check 418 comprises comparing one or more data points or statistics from the statistical model with the output. If a data point or statistic from the statistical model is found in the output the likelihood the output comprises a hallucination is reduced. If a plurality of data points or statistics from the statistical model are found in the output the likelihood the output comprises a hallucination is further reduced. A likelihood of hallucination in the output may be inversely proportional to a number of data points or statistics from the statistical model that match data points or statistics in the output.

If the output comprises a candidate configuration file the check 418 comprises using one or more rules or criteria to check whether the candidate configuration file comprises a hallucination. In some examples, checking whether the candidate configuration file comprises a hallucination comprises one or more of: cross checking using a more complex model: using the same model with a creativity parameter of the model set to a low value (so the model is less creative).

In response to no hallucination being found at check 418 an action is triggered 420 to manage the communications network such as by sending a configuration file to the orchestrator in the site control plane or by sending a message to a telecommunications operator. The screen shot from operation 406 is stored together with text from the received output at operation 416 and this pair is stored for use as training data (since it is a labelled training example).

In response to a hallucination being found at check 418 a training example is formed 422 by using the screen shot from operation 406 and the information from the statistical model 404. The training example is optionally used to train the compact model 308 as indicated in FIG. 4.

Figure 5:
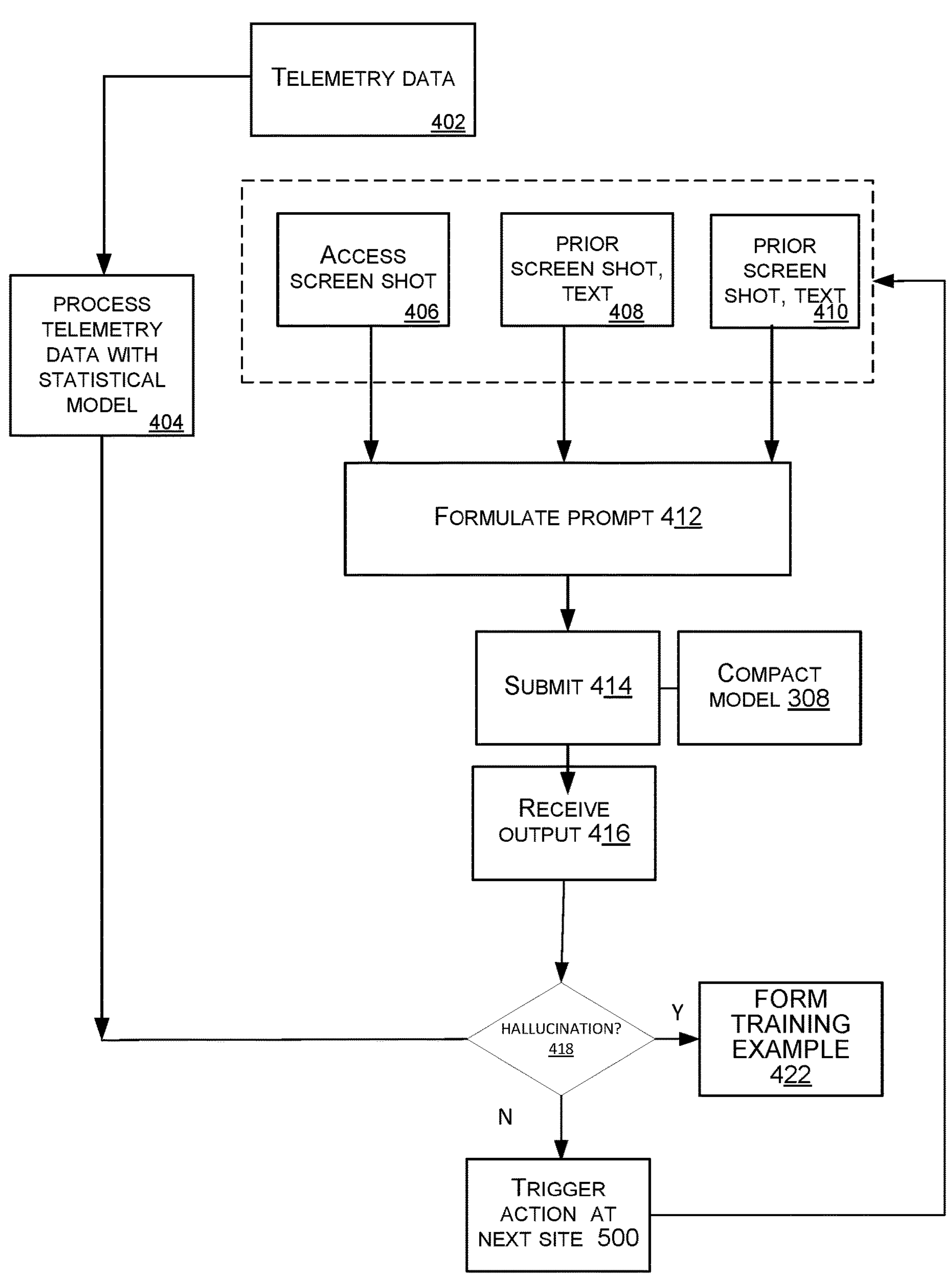
FIG. 5 is a flow diagram of a method performed by a management node for use during safe deployment practices at a private mobile communications network.

FIG. 5 is a flow diagram of a method performed by a management node for use during safe deployment practices at a private mobile communications network, wherein the private communications network comprises a plurality of sites. As part of the safe deployment practices a change is implemented at a first one of the customer sites. The compact model 308 is not yet adapted so as to take into account the change at the first one of the customer sites. Therefore telemetry data 402 is collected subsequent to the change at the first one of the customer sites. The collected telemetry data 402 is processed 404 with the statistical model.

The change at the first site is assessed by accessing a screen shot 406 of the dashboard. Since the telemetry data is from the network including the first one of the customer sites, the telemetry data reflects the change.

A prompt is formulated 412 comprising the screen shot 406 and information to adapt the model to the private communications network subsequent to the change. The information to adapt the model is a plurality of pairs 408, 410 of screen shots and text. The pairs are pairs of screen shots of telemetry data subsequent to the change in the first customer network, with associated text obtained from data from the statistical model when it processed the telemetry data.

The prompt is submitted 414 to the compact model 308 which is the same compact model as described with reference to FIG. 4. An output from the model is received 416 comprising textual information about anomalies or trends depicted in the screen shot. A check 418 of the output against data from a statistical model is made, the statistical model being independent of the compact model 308. In response to the check being successful (i.e. no hallucination is found), trigger 500 an action to make the same change to another site of the private communications network. In response to the check being unsuccessful (i.e. hallucination is found), form a training example 422 comprising the screen shot and the information from the statistical modal that was using in the checking operation 418. The training example is optionally used to train the compact model 308. Since the training example is obtained as a result of detecting a hallucination it is particularly effective to training the compact model 308 using this training example since it improves a detected weakness in the compact model 308.

In some examples the method of FIG. 5 is extended to comprise selecting the first site from a plurality of possible sites of the customer according to results of another prompt submitted to the compact model. The prompt specifying the plurality of sites and requesting an order of the plurality of sites in which to roll out a change according to safe deployment practices. This is found to be particularly effective since language models are found to have good performance on scheduling and planning tasks.

Figure 6:
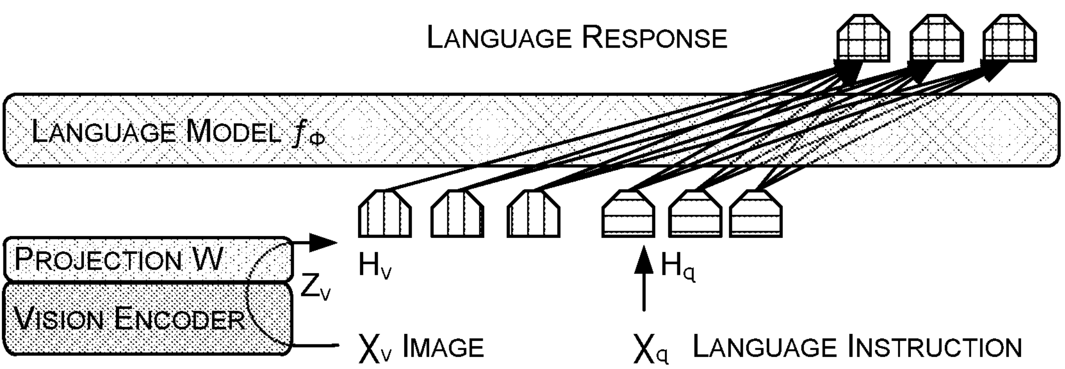
FIG. 6 is a schematic diagram of a visual language model for use in the present technology.

FIG. 6 is a schematic diagram of one example of a visual language model comprising a vision encoder, a projection mechanism W and a language model. The language model is a pre-trained large language model such as generative pretrained transformer GPT-4, BLOOM, LLAMA or other large language model. The vision encoder is a pre-trained vision encoder neural network such as contrastive language-image pre-training CLIP model, ViT (Vision Transformer), LiT: zero-shot transfer with locked-image tuning, CoCa: contrastive captioners are image-text foundation models, or other vision encoder neural network.

In an example the vision encoder is a transformer encoder which takes image patches (also referred to as tokens) as input. An input image is partitioned into patches. The contents of each patch is represented by a vector (by linearly mapping pixel values to a vector) which forms an input of the transformer and is referred to as an input embedding. For each patch, the location of the patch is encoded using a position embedding which is concatenated with the input embedding. The vectors may be discretized to remove local noise.

The projection mechanism W is a trainable projection matrix to convert an embedding (denoted Zv) of an image (denoted Xv) into language embedding tokens (denoted Hq) which have the same dimensionality of a word embedding space in the language model. When an image Xv and language instruction (denoted Xq) associated with the image (e.g. a query about the image such as "what is happening in the image", or "is there an anomaly in the image", or "tell me about any trends shown in the dashboard screenshot") are receive these are converted into a sequence of embeddings of tokens. In FIG. 6 the sequence comprises three embeddings of language instruction tokens Hq followed by three embeddings of image embeddings Hv. The sequence of embeddings are input to the language model which generates a language response (denoted Xa) comprising embeddings which are converted into text. The language response is text which may comprise information about anomalies and/or trends depicted in the screenshot. In some cases the language response is a configuration file for input to an orchestrator of a communications network.

In some examples, rather than using projection mechanism W to connect the image and language representations, a more sophisticated mechanism may be used such as a gated cross-attention. A benefit of using the projection mechanism W is the lightweight cost effective nature which allows to iterate quickly. This is found to be especially useful for the safe deployment practices where there are multiple sites at which to roll out telecommunications network changes.

Training data comprising multi-turn conversation data is obtained. A multi turn conversation comprises a plurality of questions and answers which are part of the same dialog. An example of a multi-turn conversation is:

What type of vehicle is shown in the image?

The image shows a red vehicle with four doors.

Where is the vehicle.

The vehicle is stopped in a traffic queue.

What type is the vehicle.

The vehicle is a sport utility vehicle.

The training data is obtained from manual analysis of images, human crowd sourcing and/or is obtained from a machine learning model.

The pre-trained language model is optionally tuned using the training data. Any supervised training algorithm is used for the tuning process such as a by using an auto-regressive training objective.

The projection mechanism W is trained by freezing the weights of the visual encoder and the language model, and updating only trainable parameters of the projection mechanism W (which is a matrix). The training data comprises a plurality of single turns, each single turn being a single turn from one of the multi-turn conversations.

Subsequent to training the projection mechanism, fine tuning is carried out end-to-end. During this stage of the training only the visual encoder weights are kept frozen. The pre-trained weights of the large language model and the weights of the projection mechanism W are updated. The training is supervised training using any suitable training algorithm such as back propagation with gradient descent.

The visual language model of FIG. 6 has tens of billions of parameters. The visual language model of FIG. 6 is an example of the remote model in the cloud. To form the compact model 102 used at the customer site, knowledge distillation is used to form a compact version of the visual language model of FIG. 6 in some examples. The visual language model of FIG. 6 is referred to as a teacher model and computes soft labels on the training data. The soft labels are output probability distributions. Each training example from the training data is input to the model of FIG. 6 which computes output text and an associated probability distribution indicating uncertainty of the output text prediction. The probability distributions express the teacher model's confidence scores across labels. The compact model is referred to as a student model. It is trained on the same training data with the soft labels. Subsequently the student model is fine tuned on the dataset with hard labels (the ground truth labels of the training data set which are the known answers to the queries about the images). The performance of the student model is evaluated in terms of a loss function that quantifies how well the student model's predictions match the ground truth labels (i.e. supervised learning). The student model has significantly fewer parameters than the teacher model. In this way a compact version of the teacher model is obtained without significant loss of accuracy.

Figure 7:
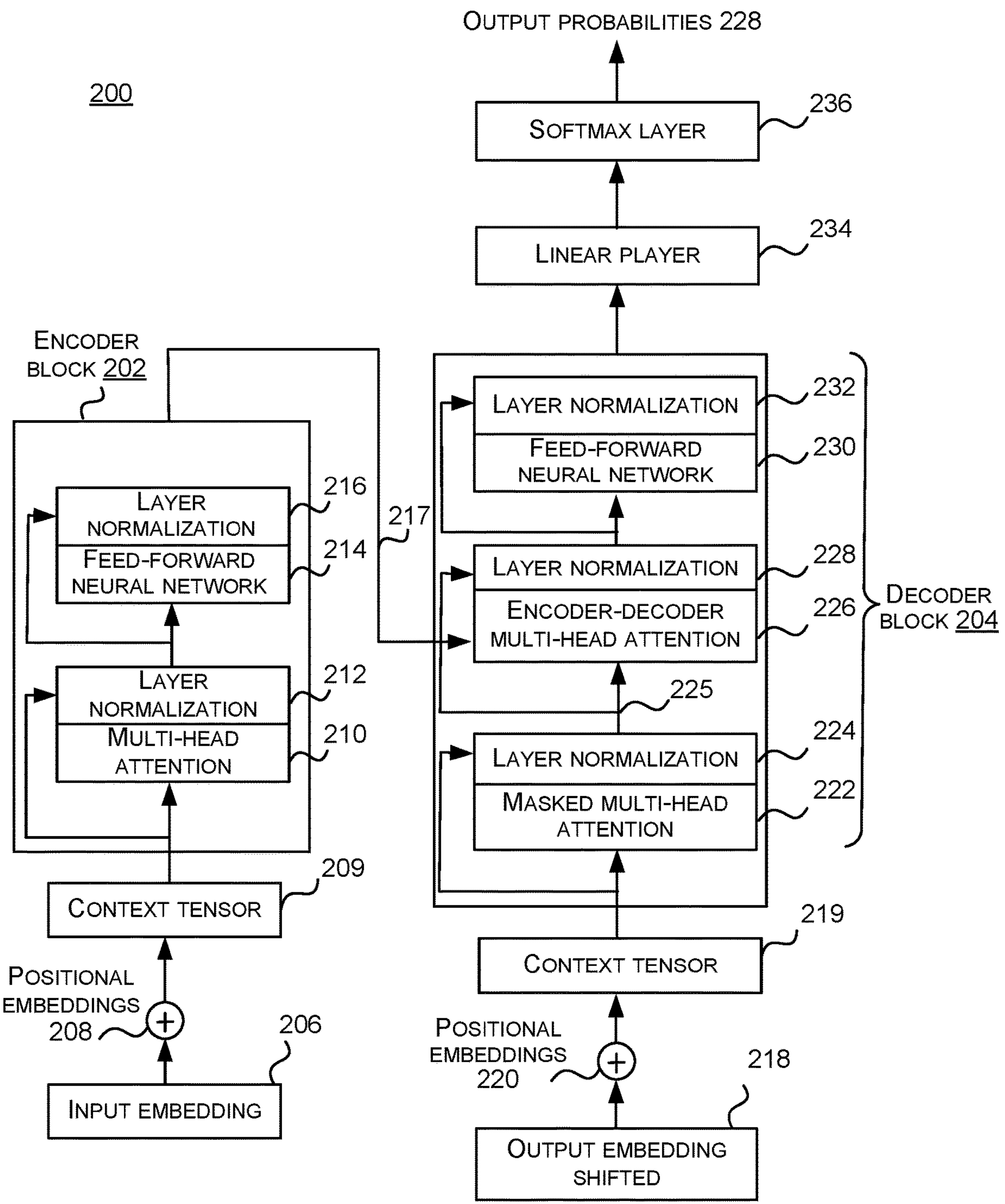
FIG. 7 is a schematic diagram of a language model for use in an example of a visual language model.

FIG. 7 shows an exemplary architecture of a language model which is a neural network transformer model 700 for use in the visual language model of FIG. 6. The example of FIG. 6 is one example of an architecture of a language model for use in forming the visual language model and is not intended to be limiting.

The neural network transformer model 700 comprises a plurality of layers of nodes interconnected by edges. There may be as many as several hundred layers of nodes in some examples. The neural network 700 comprises a plurality of transformers implementing self-attention and comprises a plurality of attention heads. Attention heads are used to direct the neural network to focus on a subset of features or tokens in an input sequence thereby learning different representations from the different positions of the tokens in an input sequence. Attention heads and transformers provide the model with a better capability to learn the task at hand thereby generating more accurate predictions of anomalies and/or trends in visual representations of telemetry data.

The neural network transformer model 700 contains one or more encoder blocks 702 coupled to one or more decoder blocks 704. The initial inputs to an encoder block 702 are the input embeddings 706 of an input sequence of a training dataset. In order to retain the order of the tokens in the input embedding 706, positional embeddings 708 are added to the input embedding 706 forming a context tensor 709. The initial inputs to the decoder block 704 are a shifted sequence of the output embeddings 718 from a previous time step to which the positional embeddings 720 are added forming context tensor 719.

An encoder block 702 consists of at least two layers. The first layer includes a multi-head attention component 710 followed by layer normalization component 712. The second layer includes a feed-forward neural network 714 followed by a layer normalization component 716. The context tensor 709 is input into the multi-head attention component 710 of the first encoder block 702 with a residual connection to the layer normalization component 712. The output of the layer normalization component 712 is input to the feed-forward neural network 714 with another residual connection to layer normalization component 716. The output of the encoder block 702 is a set of hidden representations 717. The set of hidden representations 717 is then sent through additional encoder blocks. At the last encoder block, the set of hidden representations 717 is sent to the decoder 704.

Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The multi-head attention component 710 takes a context tensor 709 and weighs the relevance of each token represented in the context tensor 709 to each other by generating attention weights for each token in the input embedding 706. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

$$MultiHead(Q, K, V) = \text{Concat}(\text{head}_1, \ldots, \text{head}_h)W^o,$$

$$\text{where head}_i = \text{Attention}\left(QW_i^Q, KW_i^X, VW_i^V\right),$$

with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$ and $W^O \in \mathbb{R}^{hd_v \times d_{model}}$.

In order to reduce the training time of the neural network transformer model, layer normalization is used between the layers. The layer normalization components 712, 716 normalize the inputs across the features. In an example, the mean and standard deviation is computed across the feature dimensions.

The feed-forward neural network 714 processes each output encoding separately. The output of the top encoder block is a set of attention vectors K and V 717 which is used by the encoder-decoder multi-head attention layer 726 of the decoder block 704.

The decoder block 704 predicts each token $t_i$ in the output text one-by-one at each time step conditioned on all previously-generated target tokens $t_1 \ldots t_{i-1}$. A decoder block 704 consists of three layers. The first layer includes a masked multi-head attention component 722 followed by a layer normalization component 724. The output of the layer normalization component 725 is input into the encoder-decoder multi-head attention component 726 with a residual connection to layer normalization component 728. The second layer includes an encoder-decoder multi-head attention component 726 followed by a layer normalization component 728. The third layer includes a feed-forward neural network 730 followed by a layer normalization component 732. The output of layer normalization component 728 is input into the feed-forward neural network 730 with a residual connection to layer normalization component 732.

The masked multi-head attention component 722 receives the output embeddings of the previous timestep. The masked multi-head attention component 722 masks the output embeddings from future time steps. The encoder-decoder multi-head attention layer 722 receives queries from the previous decoder layer and the memory keys and values 717 from the output of the encoder block 702. In this manner, the decoder block 704 can attend to every position of the input sequence. The feed-forward neural network 730 processes each output encoding separately. A layer normalization component 724, 728, 732 is used between the layers in order to normalizes the inputs across the features.

In one example, the neural transformer model contains a stack of six encoder blocks and a stack of six decoder blocks which are aggregated into a neural transformer block. However, other numbers of encoder and decoder blocks may be used. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Figure 8:
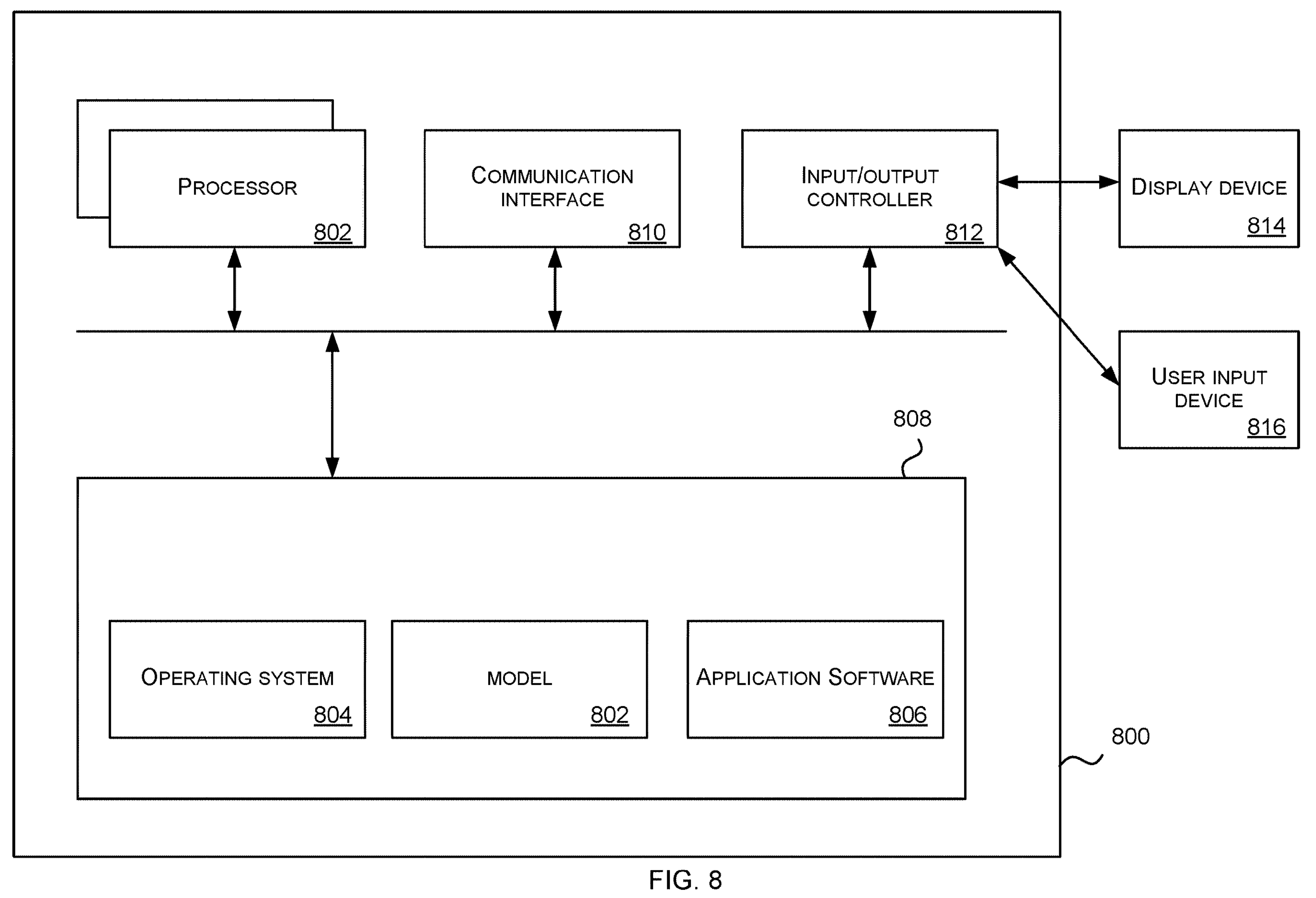
FIG. 8 is a schematic diagram of an exemplary computing-based device in which examples of a management node are implemented.

FIG. 8 illustrates various components of an exemplary computing-based device 800 which are implemented as any form of a computing and/or electronic device, and in which examples of a management node 104 are implemented in some examples.

Computing-based device 800 comprises one or more processors 802 which are microprocessors, controllers or any other suitable type of processors for processing computer executable instructions to control the operation of the device in order to carry out the method of any of FIGS. 3 to 5. In some examples, for example where a system on a chip architecture is used, the processors 802 include one or more fixed function blocks (also referred to as accelerators) which implement a part of the method of any of FIGS. 3 to 5 in hardware (rather than software or firmware). A compact model 102 is stored in memory 808 at the computing-based device 800. Platform software comprising an operating system 804 or any other suitable platform software is provided at the computing-based device to enable application software 806 to be executed on the device.

The computer executable instructions are provided using any computer-readable media that is accessible by computing based device 800. Computer-readable media includes, for example, computer storage media such as memory 808 and communications media. Computer storage media, such as memory 808, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 808) is shown within the computing-based device 800 it will be appreciated that the storage is, in some examples, distributed or located remotely and accessed via a network or other communication link (e.g. using communication interface 810).

The computing-based device 800 also comprises an input/output controller 712 arranged to output display information to a display device 814 which may be separate from or integral to the computing-based device 800. The display information may provide a graphical user interface such as to display a dashboard of graphical representations of telemetry data. The input/output controller 812 is also arranged to receive and process input from one or more devices, such as a user input device 816 (e.g. a mouse, key board, camera, microphone or other sensor). In some examples the user input device 816 detects voice input, user gestures or other user actions and provides a natural user interface (NUI). This user input may be used to select candidate configuration files for sending to an orchestrator of a site control plane. In an embodiment the display device 814 also acts as the user input device 816 if it is a touch sensitive display device.

Alternatively or in addition to the other examples described herein, examples include any combination of the following clauses.

Clause A. A method performed by a management node local to a customer site of a private communications network, the method comprising:

- storing a model, the model being a compact version of a visual language model remote from the customer site;
- accessing a first screen shot of a dashboard of telemetry data measured from the private communications network;
- formulating a prompt comprising the first screen shot and information to adapt the model to the private communications network via few shot learning;
- submitting the prompt to the model;
- receiving an output from the model comprising textual information about anomalies or trends depicted in the first screen shot;
- checking the output against data from a statistical model of the telemetry data, the statistical model being independent of the model;
- in response to the check being successful, triggering an action to manage the private communications network according to the output.

Clause B. The method of clause A wherein the information to adapt the model comprises a plurality of previous screen shots of the dashboard of telemetry data measured from the private communications network, with textual information about anomalies or trends depicted in the previous screen shots, the textual information obtained using the statistical model.

Clause C. The method of any preceding clause wherein the private communications network comprises a plurality of sites and wherein the method comprises:

- implementing a change at a first one of the sites,
- formulating a second prompt comprising a second screen shot and information to adapt the model to the private communications network subsequent to the change;
- submitting the second prompt to the model;
- receive an output from the model comprising textual information about anomalies or trends depicted in the second screen shot;
- check the output against data from a statistical model, the statistical model being independent of the model;
- in response to the check being successful, trigger an action to make the same change to another site of the private communications network.

Clause D. The method of clause C wherein the information to adapt the model to the private communications network subsequent to the change comprises a plurality of screen shots of the dashboard of telemetry data measured from the private communications network subsequent to the change, with textual information about anomalies or trends depicted in the screen shots, the textual information obtained using the statistical model.

Clause E. The method of clause D wherein the textual information is obtained using the statistical model by using rules to convert outputs of the statistical model into text.

Clause F. The method of clause C comprising selecting the first site from the plurality of sites according to results of another prompt submitted to the model, the another prompt specifying the plurality of sites and requesting an order of the plurality of sites in which to roll out a change according to safe deployment practices.

Clause G. The method of any preceding clause comprising, prior to triggering the action, obtaining a confidence value associated with the output from the model and in response to the confidence value being lower than a threshold, sending the prompt to the visual language model remote from the customer site in a core of the public communications network, obtaining a response from the visual language model, checking the response against the data from the statistical model; and in response to the check being successful, triggering the action.

Clause H. The method of clause G comprising, prior to sending the prompt to the visual language model remote from the customer site, changing the prompt by replacing the screen shot by source code used to plot a chart depicted in the screen shot, or by distilled major data points from a chart depicted in the screen shot.

Clause I. The method of any preceding clause comprising adding information about performance of the internet to the prompt.

Clause J. The method of any preceding clause wherein the action comprises sending a configuration file to an orchestrator of the private communications network and the output comprises the configuration file.

Clause K. The method of any preceding clause comprising, in response to a confidence value associated with the output from the model being lower than a threshold, for each of a specified number of consecutive outputs of the model, adapting the model using training examples obtained from the visual language model.

Clause L. The method of any preceding clause comprising, prior to triggering the action, obtaining a confidence value associated with the output, and in response to the confidence being above a threshold sending a prompt to the visual language model remote from the customer site, the prompt comprising a portion of the telemetry data associated with a potential anomaly.

Clause M. The method of clause L wherein the portion of the telemetry data is in finer detail than the telemetry data, and wherein the prompt comprises a request for a confirmation of the anomaly and suggested actions to correct the anomaly.

Clause N. The method of any preceding clause wherein checking the output against data from the statistical model of the telemetry data, comprises: where the output indicates an anomaly, checking the anomaly is present in the data from the statistical model; and where the output indicates a trend, checking the trend is present in the data from the statistical model.

Clause O. A management node local to a customer site of a private communications network, the management node comprising:

a processor;

a memory storing instructions that, when executed by the processor, perform a method comprising:

storing a model, the model being a compact version of a visual language model remote from the customer site;

accessing a first screen shot of a dashboard of telemetry data measured from the private communications network formulating a prompt comprising the first screen shot and information to adapt the model to the private communications network via few shot learning;

submitting the prompt to the model;

receiving an output from the model comprising textual information about anomalies or trends depicted in the first screen shot;

checking the output against data from a statistical model of the telemetry data, the statistical model being independent of the model;

in response to the check being successful, triggering an action to manage the private communications network according to the output.

Clause P. The management node of clause O comprising the statistical model and wherein the statistical model is not a machine learning model.

Clause Q. The management node of clause O or clause P where the instructions, when executed by the processor, display the output comprising textual information as part of a user interface available to an operator of the private communications network to control the private communications network.

Clause R. The management node of any of clauses O to Q wherein the visual language model comprises a transformer neural network.

Clause S. The management node of any of clauses O to R wherein the private communications network is a private 5G telecommunications network.

Clause T. A method performed by a management node local to a customer site of a private communications network, the method comprising:

storing a model, the model being a compact version of a visual language model remote from the customer site;

accessing a first screen shot of a dashboard of telemetry data measured from the private communications network formulating a prompt comprising the first screen shot and information to adapt the model to the private communications network via few shot learning;

submitting the prompt to the model;

receiving an output from the model comprising textual information about anomalies or trends depicted in the first screen shot;

checking the output against data from a statistical model of the telemetry data, the statistical model being independent of the model;

in response to the check being unsuccessful, using the first screen shot and the data from the statistical model as a labelled training example to train the model.

Clause U. A method performed by a management node local to a user site of a private communications network, the method comprising:

storing a model comprising a compact version of a visual language model remote from the user site;

accessing a rendering of a first screen shot of a dashboard of telemetry data measured at the private communications network;

formulating a prompt comprising the first screen shot and information usable to adapt the model to the private communications network via few shot learning;

submitting the prompt to the model;

receiving an output from the model comprising textual information indicative of anomalies or trends depicted in the first screen shot;

checking the output against data from a statistical model of the telemetry data, the statistical model being independent of the model; and in response to the check being successful, triggering an action to manage the private communications network according to the output.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method performed by a management node local to a customer site of a private communications network, the method comprising:

storing a model, the model being a compact version of a visual language model remote from the customer site;

accessing a first screen shot of a dashboard of telemetry data measured from the private communications network;

formulating a prompt comprising the first screen shot and information to adapt the model to the private communications network via few shot learning;

submitting the prompt to the model;

receiving an output from the model comprising textual information about anomalies or trends depicted in the first screen shot;

checking the output against data from a statistical model of the telemetry data, the statistical model being independent of the model; and in response to the check being successful, triggering an action to manage the private communications network according to the output.

2. The method of claim 1, wherein the information to adapt the model comprises a plurality of previous screen shots of the dashboard of telemetry data measured from the private communications network, with textual information about anomalies or trends depicted in the previous screen shots, the textual information obtained using the statistical model.

3. The method of claim 1, wherein the private communications network comprises a plurality of sites and wherein the method further comprises:

implementing a change at a first one of the sites, formulating a second prompt comprising a second screen shot and information to adapt the model to the private communications network subsequent to the change;

submitting the second prompt to the model;

receiving an additional output from the model comprising textual information about anomalies or trends depicted in the second screen shot;

checking the additional output against data from the statistical model, the statistical model being independent of the model; and in response to the check being successful, triggering an action to make the same change to another site of the private communications network.

4. The method of claim 3, wherein the information to adapt the model to the private communications network subsequent to the change comprises a plurality of screen shots of the dashboard of telemetry data measured from the private communications network subsequent to the change, with textual information about anomalies or trends depicted in the plurality of screen shots, the textual information obtained using the statistical model.

5. The method of claim 4, wherein the textual information about the anomalies or trends depicted in the plurality of screen shots is obtained using the statistical model by using rules to convert outputs of the statistical model into text.

6. The method of claim 3, further comprising selecting the first site from the plurality of sites according to results of another prompt submitted to the model, the another prompt specifying the plurality of sites and requesting an order of the plurality of sites in which to roll out a change according to safe deployment practices.

7. The method of claim 1, further comprising, prior to triggering the action, obtaining a confidence value associated with the output from the model and in response to the confidence value being lower than a threshold:

sending the prompt to the visual language model remote from the customer site in a core of the private communications network;

obtaining a response from the visual language model;

checking the response against the data from the statistical model; and in response to the check being successful, triggering the action.

8. The method of claim 7, further comprising, prior to sending the prompt to the visual language model remote from the customer site, changing the prompt by replacing the screen shot with source code used to plot a chart depicted in the screen shot, or with distilled major data points from a chart depicted in the screen shot.

9. The method of claim 1, further comprising adding information about performance of the internet to the prompt.

10. The method of claim 1, further wherein the action comprises sending a configuration file to an orchestrator of the private communications network and the output comprises the configuration file.

11. The method of claim 1, further comprising:

in response to a confidence value associated with the output from the model being lower than a threshold, for each of a specified number of consecutive outputs of the model, adapting the model using training examples obtained from the visual language model.

12. The method of claim 1, further comprising:

prior to triggering the action, obtaining a confidence value associated with the output, and in response to the confidence being above a threshold sending a prompt to the visual language model remote from the customer site, the prompt comprising a portion of the telemetry data associated with a potential anomaly.

13. The method of claim 12, wherein the portion of the telemetry data is in finer detail than the telemetry data, and wherein the prompt comprises a request for a confirmation of the anomaly and suggested actions to correct the anomaly.

14. The method of claim 1, wherein checking the output against data from the statistical model of the telemetry data, comprises: where the output indicates an anomaly, checking the anomaly is present in the data from the statistical model; and where the output indicates a trend, checking the trend is present in the data from the statistical model.

15. A management node local to a customer site of a private communications network, the management node comprising:

a processor;

a memory storing instructions that, when executed by the processor, cause the management node perform operations comprising:

storing a model, the model being a compact version of a visual language model remote from the customer site;

accessing a first screen shot of a dashboard of telemetry data measured from the private communications network;

formulating a prompt comprising the first screen shot and information to adapt the model to the private communications network via few shot learning;

submitting the prompt to the model;

receiving an output from the model comprising textual information about anomalies or trends depicted in the first screen shot;

checking the output against data from a statistical model of the telemetry data, the statistical model being independent of the model; and in response to the check being successful, triggering an action to manage the private communications network according to the output.

16. The management node of claim 15, further comprising the statistical model and wherein the statistical model is not a machine learning model.

17. The management node of claim 15, where the instructions, when executed by the processor, cause the management node perform operations comprising displaying the output comprising textual information as part of a user interface available to an operator of the private communications network to control the private communications network.

18. The management node of claim 15, wherein the visual language model comprises a transformer neural network.

19. The management node of claim 15, wherein the private communications network is a private 5G telecommunications network.

20. A method performed by a management node local to a customer site of a private communications network, the method comprising:

storing a model, the model being a compact version of a visual language model remote from the customer site;

accessing a first screen shot of a dashboard of telemetry data measured from the private communications network;

formulating a prompt comprising the first screen shot and information to adapt the model to the private communications network via few shot learning;

submitting the prompt to the model;

receiving an output from the model comprising textual information about anomalies or trends depicted in the first screen shot;

checking the output against data from a statistical model of the telemetry data, the statistical model being independent of the model; and in response to the check being unsuccessful, using the first screen shot and the data from the statistical model as a labelled training example to train the model.

* * * * *